(12) United States Patent
Cauley

(10) Patent No.: US 12,150,412 B2
(45) Date of Patent: Nov. 26, 2024

(54) ELECTRONICALLY CONTROLLED VISCOUS COUPLER FOR COMBINE HARVESTER

(71) Applicant: CNH Industrial America LLC, New Holland, PA (US)

(72) Inventor: Christopher M. Cauley, West Chester, PA (US)

(73) Assignee: CNH Industrial America LLC, New Holland, PA (US)

( * ) Notice: Subject to any disclaimer, the term of this patent is extended or adjusted under 35 U.S.C. 154(b) by 844 days.

(21) Appl. No.: 17/245,260

(22) Filed: Apr. 30, 2021

(65) Prior Publication Data

US 2022/0348412 A1 Nov. 3, 2022

(51) Int. Cl.
*A01F 12/46* (2006.01)
*A01D 90/10* (2006.01)
*F16D 35/02* (2006.01)
*G05D 9/12* (2006.01)

(52) U.S. Cl.
CPC .............. *A01F 12/46* (2013.01); *A01D 90/10* (2013.01); *F16D 35/028* (2013.01); *G05D 9/12* (2013.01); *B65G 2811/095* (2013.01)

(58) Field of Classification Search
CPC ....... A01F 12/46; A01D 90/10; F16D 35/028; B65G 2811/095
See application file for complete search history.

(56) References Cited

U.S. PATENT DOCUMENTS

| | | | | |
|---|---|---|---|---|
| 1,663,825 A | * | 3/1928 | Benjamin | A01F 12/46 198/312 |
| 2,617,351 A | * | 11/1952 | Graham, Jr. | B65G 69/20 34/328 |
| 2,756,887 A | * | 7/1956 | Raney | B60P 1/36 198/300 |
| 2,771,203 A | * | 11/1956 | Collins | A01K 5/005 198/607 |
| 3,214,049 A | * | 10/1965 | Grove | A01D 90/10 198/606 |
| 3,286,862 A | * | 11/1966 | Hansen | E01C 19/2045 198/314 |

(Continued)

FOREIGN PATENT DOCUMENTS

| | | | | |
|---|---|---|---|---|
| AU | 2006275569 A2 | * | 9/2008 | F16D 35/00 |
| AU | 2010322199 B2 | * | 8/2015 | F16D 25/02 |

(Continued)

OTHER PUBLICATIONS

Extended European Search Report for EP Application 22169224.7 dated Sep. 27, 2022 (7 pages).

*Primary Examiner* — Thomas B Will
*Assistant Examiner* — Ashley A Kaercher
(74) *Attorney, Agent, or Firm* — Peter K. Zacharias; Rebecca L. Henkel; Rickard K. DeMille

(57) ABSTRACT

An apparatus for feeding or conveying grain includes (i) a conveyor for moving grain and having an input end and an output end, and (ii) a viscous clutch either directly or indirectly connected to the input end of the conveyor for transmitting torque from an input component to the conveyor in a variable manner. A method of feeding or conveying grain using the conveyor includes operating the viscous clutch to transmit torque from the input component to the conveyor.

16 Claims, 4 Drawing Sheets

(56) References Cited

U.S. PATENT DOCUMENTS

| | | | | |
|---|---|---|---|---|
| 3,345,042 | A | * | 10/1967 | Ryan ..................... A01K 5/005 366/186 |
| 3,380,320 | A | * | 4/1968 | Zierick .................. F16D 67/00 192/61 |
| 3,460,698 | A | * | 8/1969 | Harris .................... A01D 90/10 414/502 |
| 3,511,399 | A | * | 5/1970 | Peter ..................... A01D 90/10 414/526 |
| 3,612,410 | A | * | 10/1971 | Steinke ................. A01D 90/10 239/675 |
| 3,760,770 | A | * | 9/1973 | Weaver .................... B60K 1/00 180/68.5 |
| 3,825,138 | A | * | 7/1974 | Pool .................. A01D 41/1217 198/674 |
| 3,873,032 | A | * | 3/1975 | Jellis, Jr. .................. B60P 1/38 198/614 |
| 3,999,674 | A | * | 12/1976 | Meitl .................... A01F 29/005 241/101.76 |
| 4,033,518 | A | * | 7/1977 | Fleming ................. A01F 29/00 241/222 |
| 4,100,720 | A | * | 7/1978 | Carnewal ............... A01F 12/52 460/119 |
| 4,898,267 | A | * | 2/1990 | Garrett ................. F16D 35/028 192/82 T |
| 5,100,281 | A | * | 3/1992 | Grieshop ............... A01D 90/10 414/526 |
| 6,651,412 | B1 | * | 11/2003 | Sierk .................... A01D 75/182 56/11.2 |
| 6,984,172 | B2 | * | 1/2006 | Talbi .................. A01D 41/1274 460/59 |
| 8,056,695 | B2 | * | 11/2011 | Silbernagel ........... A01D 69/08 192/84.1 |
| 8,100,241 | B2 | * | 1/2012 | Hennessy ............. F16D 35/024 192/58.61 |
| 9,254,773 | B2 | * | 2/2016 | Farley ..................... B60P 1/42 |
| 10,542,677 | B1 | * | 1/2020 | Kringstad ............. A01D 33/08 |
| 10,624,269 | B1 | * | 4/2020 | Linde .................... A01D 90/10 |
| 10,743,474 | B1 | * | 8/2020 | Schlimgen ........... B65G 41/008 |
| 2008/0023288 | A1 | * | 1/2008 | Boyer .................. F16D 35/028 192/58.61 |
| 2009/0084650 | A1 | * | 4/2009 | Hennessy ............. F16D 35/024 192/58.61 |
| 2010/0193411 | A1 | * | 8/2010 | Redekop ................... B07B 4/02 209/509 |
| 2010/0209223 | A1 | * | 8/2010 | Van Mill ............... B65G 67/24 414/526 |
| 2012/0017556 | A1 | * | 1/2012 | Reeves .............. A01D 41/1217 56/16.4 R |
| 2012/0099948 | A1 | * | 4/2012 | Bump ..................... B65G 69/00 414/21 |
| 2013/0089398 | A1 | * | 4/2013 | Farley ..................... B60P 1/40 198/608 |
| 2013/0213770 | A1 | * | 8/2013 | Schreiner ............... B65G 33/24 198/550.2 |
| 2013/0251484 | A1 | * | 9/2013 | Wood ................... A01D 43/073 414/345 |
| 2014/0365170 | A1 | * | 12/2014 | Van Mill ................... B60P 1/42 414/21 |
| 2015/0223400 | A1 | * | 8/2015 | Van Mill ................. A01D 90/10 414/505 |
| 2015/0237804 | A1 | * | 8/2015 | Van Mill ................... B60P 1/42 414/523 |
| 2017/0089409 | A1 | * | 3/2017 | Mehravaran ......... F16D 35/028 |
| 2017/0118914 | A1 | * | 5/2017 | Bruns .................... A01D 90/10 |
| 2017/0290270 | A1 | * | 10/2017 | Van Mill ..................... B60P 1/42 |
| 2019/0082595 | A1 | * | 3/2019 | Advani ............. A01D 41/1272 |
| 2019/0307074 | A1 | * | 10/2019 | Gerdeman ............. A01D 90/10 |
| 2019/0335665 | A1 | * | 11/2019 | Veikle ................ A01D 41/1217 |
| 2019/0335666 | A1 | * | 11/2019 | Veikle ................ A01D 41/1217 |
| 2019/0337725 | A1 | * | 11/2019 | Gerdeman ............. B65G 33/14 |
| 2020/0008356 | A1 | * | 1/2020 | Gerdeman ................. B60P 1/40 |
| 2020/0045887 | A1 | * | 2/2020 | Bump .................... G01G 13/16 |
| 2020/0323136 | A1 | * | 10/2020 | Brandmeier ........... B65G 33/14 |
| 2020/0339359 | A1 | * | 10/2020 | Bergkamp .............. A01F 12/46 |
| 2020/0354154 | A1 | * | 11/2020 | Grieshop ............... B65G 33/14 |
| 2020/0359566 | A1 | * | 11/2020 | Schlimgen ............... B60P 1/48 |
| 2020/0367436 | A1 | * | 11/2020 | Schlimgen ............. B65G 33/32 |
| 2020/0375113 | A1 | * | 12/2020 | Kringstad .............. B65G 67/24 |
| 2020/0399054 | A1 | * | 12/2020 | Petersen ................ A01C 15/003 |
| 2022/0348412 | A1 | * | 11/2022 | Cauley ................. B65G 33/34 |

FOREIGN PATENT DOCUMENTS

| | | | | |
|---|---|---|---|---|
| AU | 2014242253 | A1 | * | 10/2015 ............. F16D 35/02 |
| AU | 2013317890 | B2 | * | 3/2017 ............. F16D 35/00 |
| BR | 102015027934 | A2 | * | 5/2017 |
| CA | 2847059 | A1 | * | 9/2014 ................ B60P 1/42 |
| CA | 3072823 | A1 | * | 4/2020 ........... A01D 41/133 |
| CA | 3044927 | A1 | * | 11/2020 ......... A01D 41/1217 |
| CA | 3078061 | A1 | * | 11/2020 ............. A01D 90/10 |
| CN | 1095038 | A | * | 11/1994 |
| CN | 202857317 | U | * | 4/2013 ............. A01D 41/12 |
| CN | 103224117 | A | * | 7/2013 ............. B65G 15/30 |
| CN | 103939497 | A | * | 7/2014 |
| CN | 107018748 | A | * | 8/2017 ............. A01D 41/02 |
| CN | 106134627 | A | * | 11/2017 ............. A01D 41/12 |
| CN | 109743973 | A | * | 5/2019 ............. A01D 45/10 |
| CN | 110169255 | A | * | 8/2019 ............. A01D 41/12 |
| CN | 110476589 | A | * | 11/2019 ............. A01D 37/00 |
| CN | 111903338 | A | * | 11/2020 ......... A01D 41/1217 |
| DE | 19750976 | A1 | * | 6/1999 |
| DE | 102010043344 | A1 | * | 5/2011 ............. A01D 90/10 |
| DE | 102013101556 | A1 | * | 4/2014 ............. F16D 35/02 |
| DE | 102013101553 | A1 | * | 6/2014 ............. F16D 27/112 |
| DE | 102020205615 | A1 | * | 11/2020 ......... A01D 41/1217 |
| EP | 1606990 | A2 | * | 12/2005 ............. A01D 90/10 |
| EP | 1256270 | B1 | * | 4/2006 ......... A01D 41/1274 |
| EP | 1674752 | A1 | * | 6/2006 ............. F01P 7/042 |
| EP | 2421354 | A1 | * | 2/2012 ............. A01D 69/02 |
| EP | 2952432 | A1 | * | 12/2015 ............. B64D 9/00 |
| EP | 2965612 | A1 | * | 1/2016 ............. A01D 41/12 |
| EP | 2952085 | B1 | * | 11/2017 ......... A01D 41/1217 |
| EP | 3298875 | A1 | * | 3/2018 ......... A01D 41/1217 |
| EP | 3395150 | A1 | * | 10/2018 ......... A01D 41/1217 |
| FR | 2752566 | A1 | * | 2/1998 ............. A01D 90/10 |
| GB | 1582084 | A | * | 12/1980 ............. A01D 90/10 |
| GB | 2115074 | A | * | 9/1983 ............. B65G 53/30 |
| GB | 2115187 | A | * | 9/1983 ............. B65G 53/30 |
| GB | 2346676 | A | * | 8/2000 ............. F16D 35/022 |
| JP | 2001224233 | A | * | 8/2001 |
| JP | 6329241 | B2 | * | 5/2018 ............. F16D 35/005 |
| NL | 9500561 | A | * | 11/1996 ............. A01K 5/0258 |
| WO | WO-2010038608 | A1 | * | 4/2010 ......... A01D 41/1217 |
| WO | WO-2012024497 | A2 | * | 2/2012 ............. F16D 25/08 |
| WO | WO-2014004335 | A1 | * | 1/2014 ............. F01P 5/02 |
| WO | WO-2015152362 | A1 | * | 10/2015 ............. A01D 41/12 |
| WO | WO-2016046187 | A1 | * | 3/2016 ......... A01D 41/1208 |
| WO | WO-2016147452 | A1 | * | 9/2016 ......... A01D 41/1208 |
| WO | WO-2017038641 | A1 | * | 3/2017 ............. A01D 41/12 |
| WO | WO-2017110530 | A1 | * | 6/2017 ............. A01D 41/02 |
| WO | WO-2017155062 | A1 | * | 9/2017 ............. A01F 12/46 |
| WO | WO-2018057276 | A2 | * | 3/2018 ............. F16D 27/14 |
| WO | WO-2018230163 | A1 | * | 12/2018 ............. A01D 41/02 |
| WO | WO-2019026566 | A1 | * | 2/2019 ............. F16D 27/01 |
| WO | WO-2019213077 | A1 | * | 11/2019 ............. A01D 90/10 |
| WO | WO-2020129397 | A1 | * | 6/2020 |

* cited by examiner

ELECTRONICALLY CONTROLLED VISCOUS COUPLER FOR COMBINE HARVESTER

FIELD OF THE INVENTION

The present invention relates to an electronically controlled viscous coupler for a mechanical power transmission system, such as a grain unloading system of a combine harvester.

BACKGROUND OF THE INVENTION

As is described in U.S. Pat. No. 9,254,773 to CNH America LLC (the '773 Patent), which is incorporated by reference in its entirety and for all purposes, combine grain tank unloading systems of combine harvesters typically consist of single or multiple apparatus including a cross conveyor or conveyors, that feed grain to an unloader conveyor or conveyors, and a vertical unloader conveyor, such as an auger, operable for lifting the grain to a generally horizontal conveyor or auger that conveys the grain to a truck or other holding bin.

It would be desirable to have a capability to control the unload rate of an unloader conveyor, for instance, to more accurately meter grain to top off trucks or other receptacles, and to fill smaller wagons and receptacles.

SUMMARY OF THE INVENTION

In view of the foregoing Background, disclosed herein is a viscous clutch for use with combine grain tank unloading systems of combine harvesters. It should be understood, however, that the viscous clutch is not limited for use with unloading systems, rather, the viscous clutch is applicable for use with any variable speed (non-zero control) mechanical power transmission system, such as those systems in a combine harvester.

According to one aspect of the invention, an apparatus for feeding or conveying grain comprises a conveyor for moving grain having an input end and an output end; and a viscous clutch either directly or indirectly connected to the input end of the conveyor for transmitting torque from an input component to the conveyor in a variable manner.

According to another aspect of the invention, a method of feeding or conveying grain using a conveyor in an agricultural vehicle, said method comprising: operating a viscous clutch, which is either directly or indirectly connected to an input end of the conveyor, to transmit torque from an input component to the conveyor in a variable manner.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
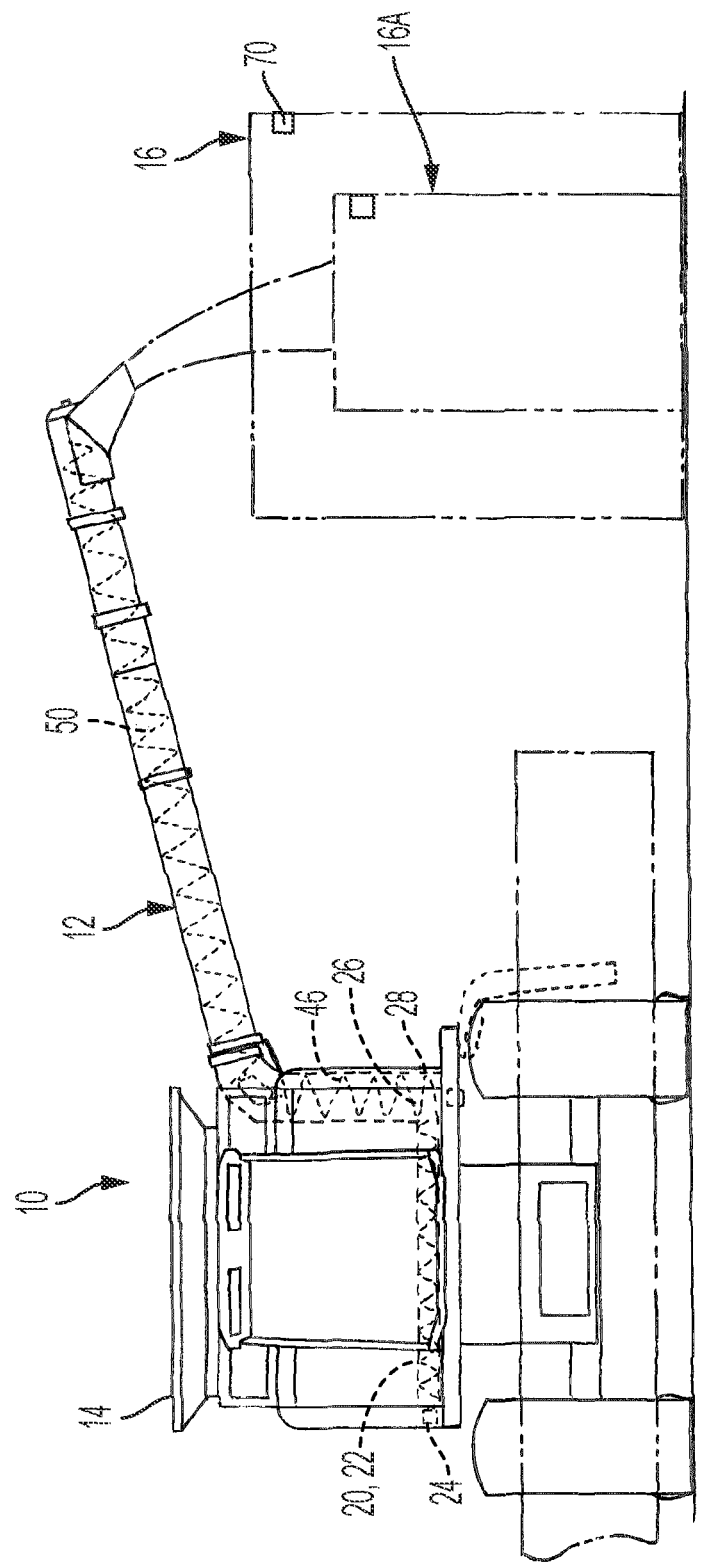
FIG. 1 is a simplified front view of a representative agricultural harvesting machine, including an unloader conveyor controllably operable for unloading grain from a grain tank of the machine into an accompanying receptacle, also shown.

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

Referring now the drawings, in FIG. 1, a representative agricultural harvesting machine 10 is shown, including an unloader conveyor 12 operable for unloading grain from a grain holding device, which is a conventional grain tank 14, located on an upper region of harvesting machine 10. Such a machine 10 is described in the '773 Patent. Here, harvesting machine 10 is depicted as a well-known, commercially available combine operable for harvesting a wide variety of grains, including, but not limited to, wheat, beans, corn, rice, and the like. Typically, the grain is harvested and threshed from stalks, pods, or other crop material, and conveyed away from a cleaning system of machine 10 by a clean grain conveyor to a grain elevator (not shown). The grain elevator then lifts the grain upwardly to a grain delivery conveyor which is operable for discharging the grain into grain tank 14. When grain tank 14 is filled with grain, or filled to a desired level, unloader conveyor 12 can be operated for unloading the grain from tank 14, onto the ground, or into a wagon, truck or other vehicle, or a bin or other grain receptacle 16 (larger receptacle illustrated for example) or 16A (smaller receptacle).

Figure 2:
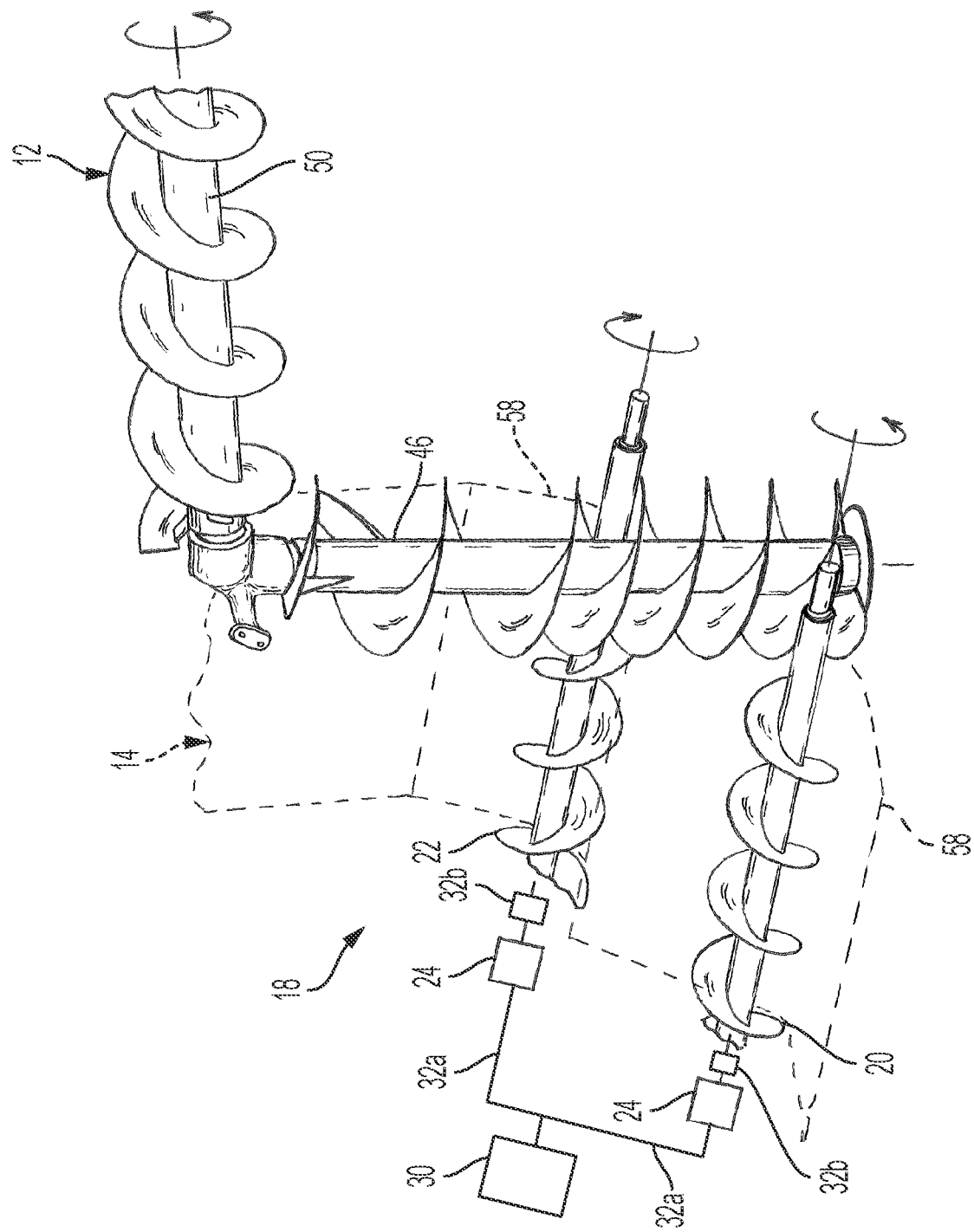
FIG. 2 is a simplified perspective view of aspects of the unloader conveyor of FIG. 1, in association with an apparatus controllable for feeding grain to the unloader conveyor.
Figure 3:
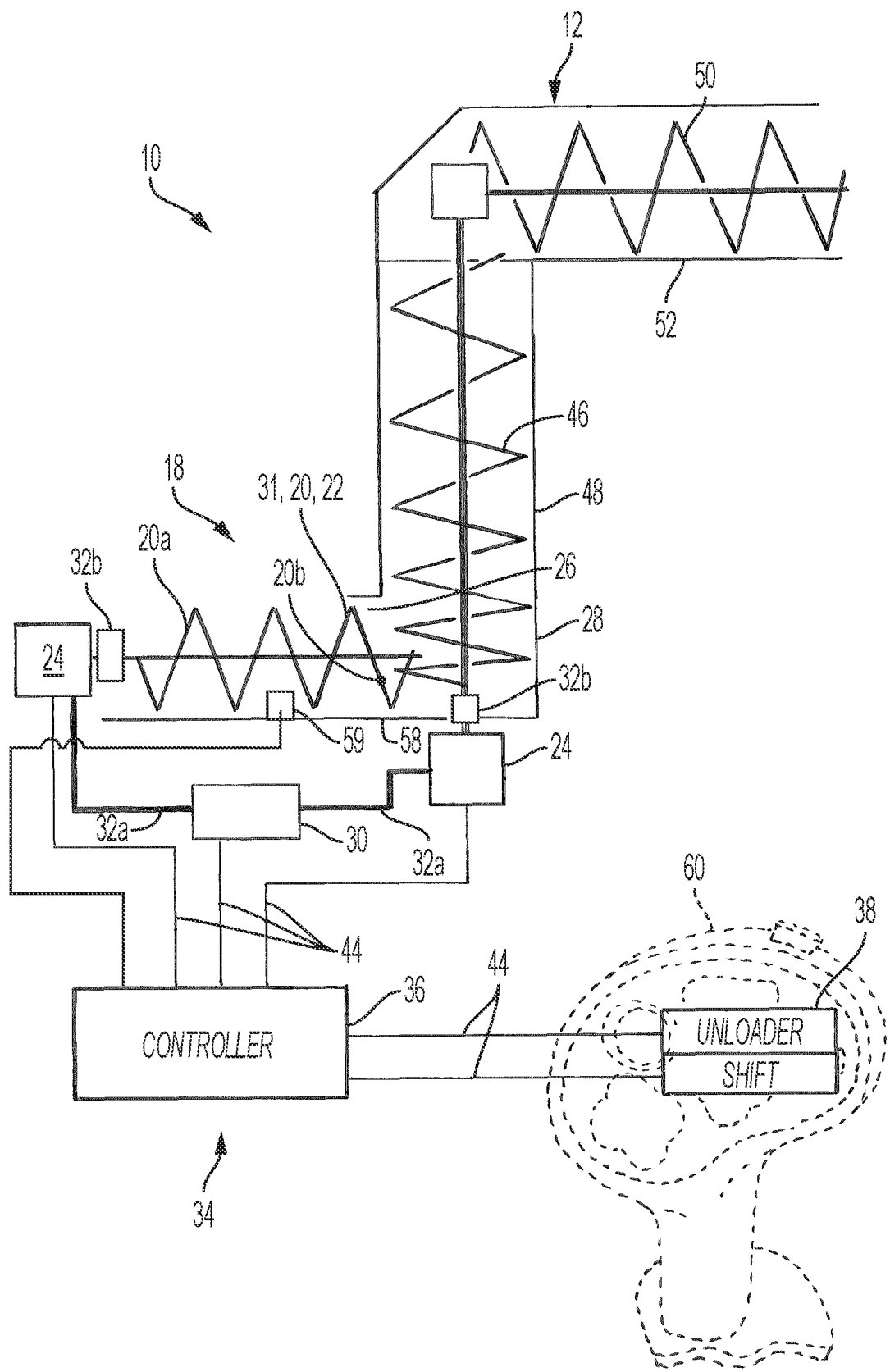
FIG. 3 is a simplified schematic representation of the unloader conveyor and associated apparatus of FIGS. 1 and 2.

Referring also to FIGS. 2 and 3, grain tank 14 includes apparatus 18 operable for feeding or conveying the grain contained therein to unloader conveyor 12. Here, apparatus 18 includes a pair of conventional cross conveyors 20 and 22 disposed in sideward extending covered troughs 58 in a floor of the grain tank, in the well-known manner. Cross conveyors 20 and 22 each comprises a generally horizontal elongate helical auger rotatable by a drive 30 (via a clutch 24) as denoted by the arrows in FIG. 2, for conveying grain through the respective troughs 58 to an opening 26 in an inlet end 28 of unloader conveyor 12. Each conveyor has an input end 20a and an opposite output end 20b. Here also, it should be noted that although apparatus 18 in grain tank 14 is illustrated including two cross conveyors 20 and 22 for feeding grain to unloader conveyor 12, a variety of other conveyor configurations can be utilized for performing this function, including, but not limited to, a single conveyor, or more than two conveyors, such as two cross conveyors that feed to a main conveyor, which, in turn, feeds the unloader conveyor. Also, although helical augers are shown, apparatus 18 can comprise other type conveyors, such as a moving belt or belts, or any other apparatus suitable for feeding grain to the unloader conveyor.

Unloader conveyor 12 here includes an elongate upwardly or generally vertically extending auger 46 supported for rotation in an upwardly extending tubular housing 48, and an elongate auger 50 oriented horizontally or at a small acute angle to horizontal, supported for rotation in an elongate tubular housing 52 connected to and forming a continuation of housing 48. Housing 52 and an upper portion of housing 48 are supported in cantilever relation by a lower portion of housing 48 for rotation relative thereto, between a sidewardly extending unloading position as shown in FIG. 1, and a rearwardly extending stowed position at about a 90 degree angle to the unloading position, in the well-known manner. Auger 50 is connected to auger 46 for rotation thereby in a suitable manner, such as by bevel gears, a Hooke's joint, or the like, also in the well-known manner. Auger 46 is driven by the drive 30 connected thereto.

A drive 30 is connected to conveyors 20, 22 and 46 for rotating conveyors in the desired rotational direction. Drive 30 may represent an engine, a motor, an electric drive motor, a fluid motor, or a driven shaft that is connected to the motor of the machine 10, for example. Although only one drive 30 is shown connected to conveyors 20, 22 and 46, it should be understood that machine 10 may include multiple independent drives 30 for independently driving conveyors 20, 22 and 46.

Drive 30 is connected to each of conveyors 20, 22 and 46 via an input component 32a, a viscous clutch 24 and an output component 32b. Input component 32a and output component 32b may each be a shaft (such as a PTO shaft), a belt, or a chain, one or more gears, a gear box or a transmission that provides a two-stage reduction in power (for example) for driving the conveyors 20, 22 and 46 at an appropriate speed.

A separate clutch 24 is associated with each conveyor 20, 22 and 46. Alternatively, and although not shown in FIG. 3, the output of a single clutch 24 may be connected to all of the conveyors 20, 22 and 46 (or output components 32b) by way of one or more belts, shafts, etc. for simultaneously controlling all of those conveyors 20, 22 and 46. Viscous clutch 24 accomplishes variable speed control for each conveyor 20, 22, 46 regardless of the speed transmitted by the input component 32a. Each clutch 24 is shown connected to the output side of the input component 32a and the input side of the output component 32b. The output side of the output component 32b is either directly or indirectly connected to one of the conveyors 20, 22 and 46. As an alternative to the embodiment shown in FIG. 3, each clutch 24 may be connected directly between drive 30 and one of the conveyors 20, 22, 46.

Machine 10 further comprises a control 34 that is operable for controlling unloader conveyor 12 and apparatus 18. Elements of control 34 include a processor based controller 36 that is connected to an input device 38, drive 30 and clutches 24 by suitable conductive paths 44. Paths 44 can be, for instance, wires of a wiring harness, or a wired or wireless communications network. To facilitate convenient and simple operation, input device 38 can be located on a multi-function or propulsion handle 60 (FIG. 3) or other location on the machine 10.

Figure 4:
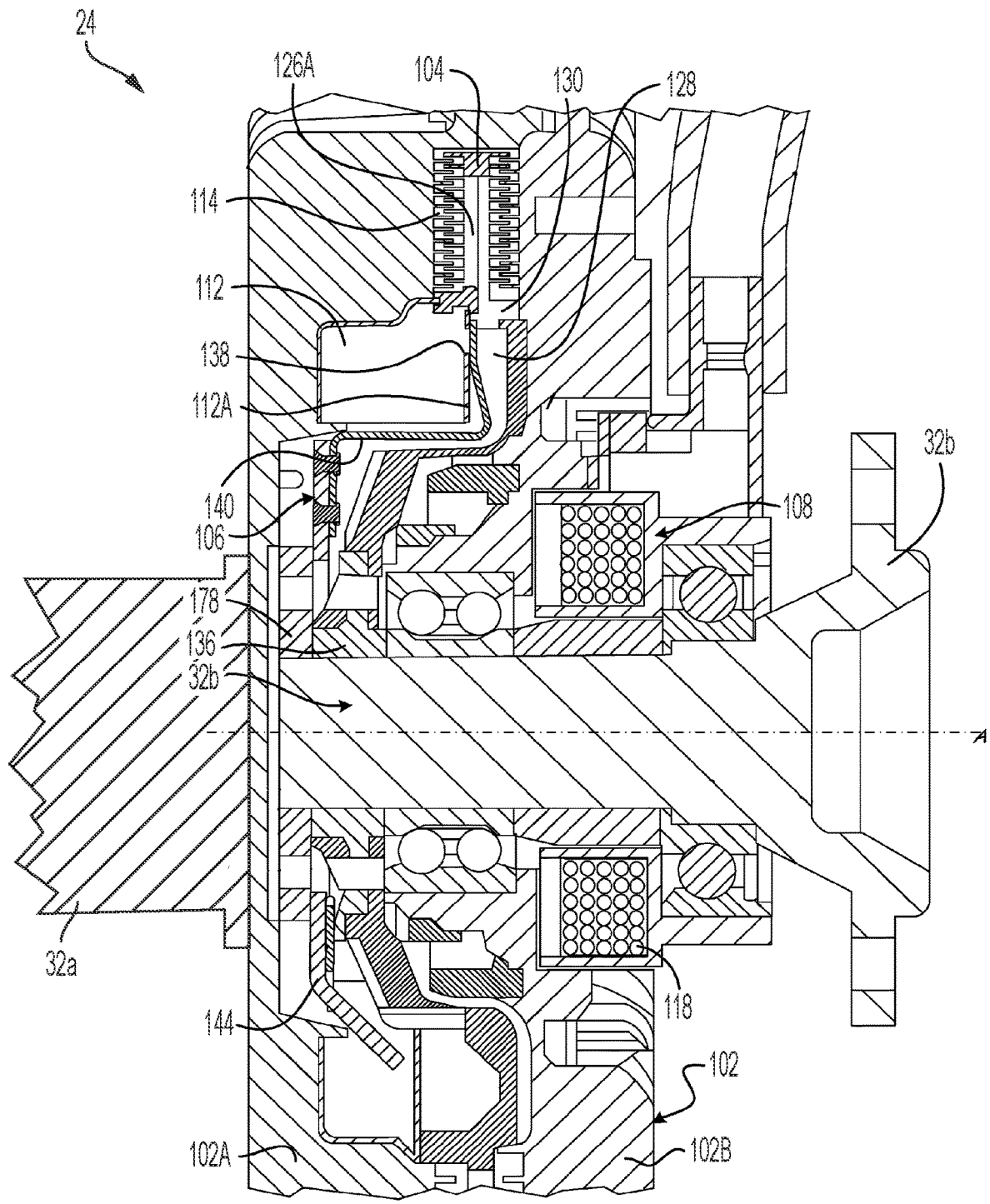
FIG. 4 is a cross-sectional view of an exemplary viscous coupler for use with the apparatus of FIG. 3.

Turning now to FIG. 4, each clutch 24 is an electromagnetically actuated viscous clutch. The details of such an exemplary clutch for use with machine 10 are described in U.S. Pat. No. 8,100,241, which is incorporated by reference herein in its entirety and for all purposes. The clutch 24 permits selective engagement between input component 32a (connected to drive 30) and output component 32b (connected to one of the conveyors 20, 22, 46), for example, to selectively drive one of the conveyors 20, 22, 46 as a function of a rotational input from the input component 32a. In a closed position of the clutch, rotation of the input component 32a is transmitted to the output component 32b, whereas, in an open position of the clutch, rotation of the input component 32a is not transmitted to the output component 32b. It is noted that clutch may not, necessarily, achieve full decoupling. Controller 36 is connected to clutches 24 for selectively varying (i.e., metering) the torque transmission between the input component 32a and the output component 32b.

Referring now to the details of the clutch 24, clutch 24 includes a rotor 104 and a housing 102 (having a front part 102a and a rear part 102B) that generally surrounds the rotor 104 to define a working chamber 114 therebetween. The input component 32a, is fixedly connected to the front part 102a of the housing 102 by one or more bolts (for example). An electromagnetically controlled valve assembly 106 regulates the flow of shear fluid (e.g., a conventional silicon oil shear fluid) from a fluid reservoir 112 through a return bore 138 to control clutch engagement. An opening 126A is formed between front and rear sides of the rotor 104, and a channel 128 is formed in the rotor 104 between the opening 126A and an area adjacent to the return bore 138. The valve assembly 106 is configured to selectively permit shear fluid to pass out of the return bore 138, through the channel 128, and then to the working chamber 114. In this way, shear fluid can be delivered to the working chamber 114 at both the front and rear sides of the rotor 104 approximately simultaneously, and the working chamber can essentially fill from an outer diameter toward and inner diameter.

The cover plate 140 of the valve assembly 106 is designed such that it is biased to uncover the opening 138 in the rear plate 112A of the reservoir 112 (i.e., an "on" or open position where the clutch 24 is engaged) by default, which permits shear fluid to flow from the reservoir 112 to the working chamber 114. This position of plate 140 is not shown. Shear fluid present in the working chamber 114 transmits torque by creating a frictional engagement between the rotor 104 and the housing 102, and the instantaneous percentage of torque transmission can vary as a function of the amount of shear fluid in the working chamber 114.

The valve assembly 106 can be electromagnetically actuated to close the opening 138 (as shown in FIG. 4). When the electromagnetic coil assembly 108 is energized (as controlled by controller 36), magnetic flux is generated by the coil 118 and is transmitted through the flux circuit to move the armature 144 toward the pole plate 178, which in turn moves the cover plate 140 toward the opening 138 in the rear plate 112A of the reservoir 112. In this way, energizing the coil assembly 108 causes the clutch 24 to disengage by covering the opening 138 more, which limits or prevents shear fluid from passing from the reservoir 112 to the working chamber 114 (as shown).

As an alternative to the arrangement described above, cover plate 140 may be normally biased to cover the opening 138, and valve assembly 106 can be actuated to uncover the opening 138.

The radial channel 128 is formed in the front side of the rotor 104, relative to the location of the cover plate 140 and the opening in the rear plate 112A of the reservoir 112. The radial channel 128 provides space for the cover plate 140 to move axially to cover and uncover the opening 138 in the rear plate 112A of the reservoir 112. In addition, the radial channel 128 and the groove 130 together form a fluid path between the opening 138 from the reservoir 112 to the opening 126A near the outer diameter (OD) of the rotor 104. In that way, input of shear fluid to the working chamber 114 occurs at one of the fluid openings (e.g., fluid opening 126A), which provides a fluid outlet that is substantially centered axially in the rotor and is substantially radially centered. Locating the fluid outlet at or near the axial center of the rotor 104 permits feeding shear fluid to the working chamber 114 at both the front and rear sides of the rotor substantially simultaneously, as well as permitting feeding the shear fluid to the working chamber 114 near the OD of the rotor 104.

During operation, the fluid pump system that includes a fluid return path (not shown) pumps shear fluid from the working chamber 114 back to the reservoir 112. Shear fluid is essentially continuously pumped back from the working chamber 114 to the reservoir 112. The clutch 24 remains engaged only by continuing to keep the valve assembly 106 in an open position, allowing more shear fluid to move (i.e., return) from the reservoir 112 to the working chamber 114. Conversely, the working chamber 114 can be effectively drained by moving the valve assembly 106 to a fully closed position, and preventing shear fluid from returning to the working chamber 114.

The degree of energization of electromagnetic coil assembly 108, which affects the amount of shear fluid in the working chamber 114, which affects the degree of torque transmission between the input 32a and output 32b, is controlled by controller 36. That degree of energization may be controlled manually by an operator of the machine 10, or automatically by a program in the memory of controller 36. The degree of energization may be adjusted (metered) by closed loop control of the rotational speed of augers 20, 22 and 46, for which the relationship between auger speed and the volume transport rate is known, in order to provide a specific grain unload rate. The speed of the augers may be monitored for the closed loop control using a rotation sensor, or the unload rate may be monitored for the closed loop control using a flow measurement device, for example. The degree of energization may also be adjusted (metered) as a function of a sensed condition, such as a material clog or jam in augers 20, 22, 46 that is detected by a pressure sensor 59 (FIG. 3) associated with output component 32b or one of the augers. Alternatively, the sensor 59 may sense a resistance to motion (i.e., rotation) of the output component 32b or auger. If a material clog is detected, then the pressure sensor 59 will communicate the same to the controller 36, and the controller 36 will disengage the clutch 24 to cease operation of the output component 32b.

Controller 36 may also communicate with a fill sensor 70 located at or near the top of grain receptacle 16. In operation, as the grain fills the receptacle 16 and eventually reaches the fill sensor 70, the fill sensor 70 transmits a signal to controller 36 such that the controller 36 understands the fill status of receptacle 16. In response thereto, controller 36 slowly energizes coil assembly 38 via controller 36 to close the opening 138 in clutch 124, thereby slowing the introduction of grain into receptacle 16. Eventually, controller 36 opens the opening 138 to a degree in which the input 32a and output 32b are coupled.

Although clutch 24 is described for use with apparatus 18 for feeding or conveying the grain contained therein to unloader conveyor 12, it should be understood that clutch 24 can be employed in other areas of machine 10 requiring variable speed between input and output components by varying torque transmission.

It is to be understood that the above-described operating steps are performed by the controller 36 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 36 described herein, such as the aforementioned method of operation, is implemented in software code or instructions which are tangibly stored on the tangible computer readable medium. Upon loading and executing such software code or instructions by the controller, the controller may perform any of the functionality of the controller described herein, including any steps of the aforementioned method described herein.

The term "software code" or "code" used herein refers to any instructions or set of instructions that influence the operation of a computer or controller 36. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for feeding or conveying grain comprising:
   a conveyor for moving grain and having an input end and an output end; and
   a viscous clutch either directly or indirectly connected to the input end of the conveyor for transmitting torque from an input component to the input end of the conveyor;
   a controller that is configured to either energize or deenergize the clutch to adjust a torque imparted to the conveyor by the input component;
   a sensor connected to the controller for detecting a fill level of a receptacle that receives the conveyed grain from the apparatus, and wherein the controller is configured to adjust a torque and speed transmitted by the viscous clutch as a function of the detected fill level.

2. The apparatus of claim 1, wherein the viscous clutch comprises a rotor, a housing that generally surrounds the rotor to define a working chamber therebetween, and an electromagnetic coil assembly for controlling a flow of fluid into the working chamber, wherein the rotor is either directly or indirectly connected to one of the conveyor and the input component, and the housing is either directly or indirectly connected to the other of the conveyor and the input component.

3. The apparatus of claim 2, wherein the input component is an engine, a shaft, a chain or a belt.

4. The apparatus of claim 1, further comprising a second sensor connected to the controller for detecting motion of the conveyor, and wherein the controller is configured to adjust a torque transmitted by the viscous clutch as a function of the detected motion.

5. The apparatus of claim 1 further comprising an unloader conveyor having an input end adjacent the output end of the conveyor.

6. The apparatus of claim 1, wherein the viscous clutch is directly connected to the input end of the conveyor.

7. The apparatus of claim 1, wherein the conveyor is an auger.

8. The apparatus of claim 1 further comprising a second conveyor and a second viscous clutch that is connected to the second conveyor, wherein each of the conveyors in a cross-auger.

9. A combine harvester comprising the apparatus of claim 1.

10. An agricultural vehicle comprising the apparatus of claim 1.

11. A method of feeding or conveying grain using a conveyor in an agricultural vehicle, said method comprising:

operating a viscous clutch, which is either directly or indirectly connected to an input end of the conveyor, to transmit torque from an input component to the conveyor in a variable manner; and detecting a fill level of a receptacle that receives the conveyed grain, and operating the viscous clutch based upon the detected fill level.

12. The method of claim 11, where the operating step comprises either energizing or deenergizing the viscous clutch.

13. The method of claim 12 further comprising metering energization of the viscous clutch to adjust a level of torque transmission between the input component and the conveyor.

14. The method of claim 13, wherein the energizing step is performed by a controller of the agricultural vehicle.

15. The method of claim 11 further comprising detecting motion of the conveyor and metering energization of the viscous clutch as a function of the detected motion.

16. The method of claim 11, wherein the conveyor is an auger.

* * * * *